(12) United States Patent
Kayano et al.

(10) Patent No.: US 6,870,319 B2
(45) Date of Patent: Mar. 22, 2005

(54) OPTICAL AXIS ADJUSTING SYSTEM FOR VEHICLE HEAD LAMP

(75) Inventors: Masayuki Kayano, Kawasaki (JP); Nobuaki Takeda, Tokyo (JP); Manabu Fujisawa, Kawasaki (JP); Kenji Hayashi, Yokohama (JP); Shigeki Fukushima, Tokyo (JP); Toyoki Shigematsu, Tokyo (JP); Shigeto Suzuki, Yokohama (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 0 days.

(21) Appl. No.: 10/194,454

(22) Filed: Jul. 12, 2002

(65) Prior Publication Data

US 2003/0086077 A1 May 8, 2003

(30) Foreign Application Priority Data

Jul. 12, 2001 (JP) ........................................ 2001-211714
Oct. 11, 2001 (JP) ........................................ 2001-313529

(51) Int. Cl.$^7$ ................................................ B60Q 1/02
(52) U.S. Cl. .......................... 315/82; 315/291; 362/464
(58) Field of Search .......................... 315/82, 291, 307, 315/209 R; 362/42, 464, 465

(56) References Cited

U.S. PATENT DOCUMENTS

| 4,225,950 A | * | 9/1980 | Kotera et al. .................. 367/97 |
| 5,260,688 A | * | 11/1993 | Curry et al. ............. 340/539.1 |
| 6,109,759 A | * | 8/2000 | Tanabe et al. ................. 362/42 |

* cited by examiner

*Primary Examiner*—Don Wong
*Assistant Examiner*—Jimmy Vu
(74) *Attorney, Agent, or Firm*—Rossi, Kimms & McDowell

(57) ABSTRACT

An optical axis adjusting system for a vehicle head lamp detects the inclination of the front part of a vehicle with respect to a road surface and controls an optical axis adjusting system by an ECU according to the detected inclination to adjust the optical axis of the head lamp. Therefore, the optical axis adjusting system is capable of finding the accurate inclination of the entire vehicle and properly adjusting the optical axis.

21 Claims, 10 Drawing Sheets

US 6,870,319 B2

OPTICAL AXIS ADJUSTING SYSTEM FOR VEHICLE HEAD LAMP

CROSS-REFERENCE TO RELATED APPLICATIONS

This non-provisional application claims priority under 35 U.S.C. §119(a) on Patent Application No. 2001-211714 filed in Japan on Jul. 12, 2001, and No. 2001-313529 filed in Japan on Oct. 11, 2001 which is herein incorporated by reference.

BACKGROUND OF THE INVENTION

1. Field of the Invention

This invention relates to an optical axis adjusting system that adjusts an optical axis of a vehicle head lamp according to the inclination of a vehicle, and more particularly to an optical axis adjustment system that is suitably applied to a truck with a cab and a deck provided on a frame.

2. Description of the Related Art

When the adjustment the optical axis of a head lamp is incorrect, light from the head lamp may dazzle drivers of other vehicles. To address this problem, a variety of techniques have been developed so as to adjust the optical axis of a head lamp according to the inclination of a vehicle and thereby prevent the head lamp from dazzling drivers of other vehicles running on the opposite lane. It is difficult, however, to find the accurate inclination of the vehicle due to variations in the amount, positions, etc. of load carried on the vehicle. It would therefore be desirable to provide an optical axis adjusting system for a head lamp, which is capable of properly adjusting the optical axis of a head lamp by finding the accurate inclination of a vehicle.

SUMMARY OF THE INVENTION

The present invention provides an optical axis adjusting system for a vehicle head lamp, comprising an optical axis adjusting device that adjusts an optical axis of the head lamp; an inclination detecting device that is disposed in a front part of a vehicle to detect the inclination of the front part of the vehicle with respect to a road surface; and a control device that controls the optical axis adjusting device according to the inclination detected by the inclination detecting device. With this arrangement, the optical axis can be easily adjusted according to the inclination of the front part of the vehicle.

BRIEF DESCRIPTION OF DRAWINGS

The invention will be explained with reference to the accompanying drawings, in which like reference characters designate the same or similar parts throughout the figures and wherein.

DETAILED DESCRIPTION OF PREFERRED EMBODIMENTS

Figure 1:
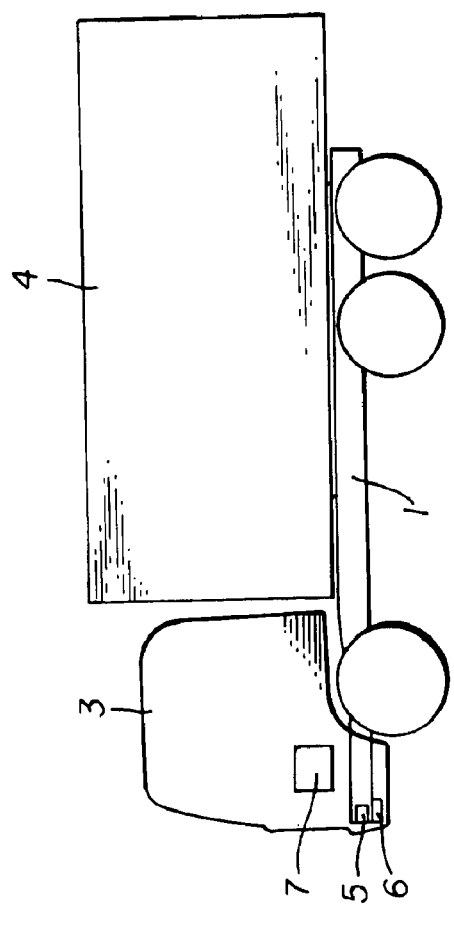
FIG. 1 is a schematic diagram showing the construction of a truck having an optical axis adjusting system for a vehicle head lamp according to an embodiment of the present invention.
Figure 2:
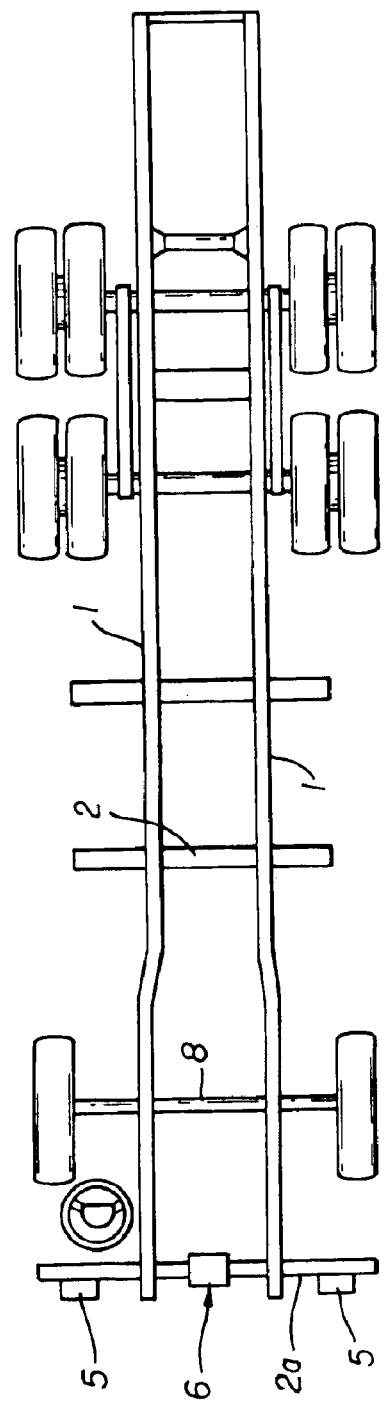
FIG. 2 is a plan view showing a frame.

A description will now be given of an optical axis adjusting system for a vehicle head lamp according to a preferred embodiment of the present invention. As shown in FIGS. 1 and 2, a pair of side frames 1 are provided with a cross member 2, and a cab 3 and a deck 4 are provided on a frame comprised of the side frames 1 and the cross member 2. Head lamps 5 are provided at both sides of a cross member 2a at the front end of a vehicle in the longitudinal direction, and an inclination sensor 6, as an inclination detecting device, is disposed at substantially the center of the cross member 2a. A signal from the inclination sensor 6 is input to an electronic control unit (ECU) 7, and the ECU 7 detects the inclination of the front part of the vehicle with respect to a road surface according to information supplied from the inclination sensor 6.

It should be noted that the head lamps 5 may be provided at the cab 3. Further, the inclination sensor 6 may be provided on a front axle 8 or at the front end of the vehicle other than the cross member 2a in the longitudinal direction of the vehicle (e.g. at the cab 3) insofar as the inclination sensor 6 is positioned in front of the front axle 8.

Figure 3:
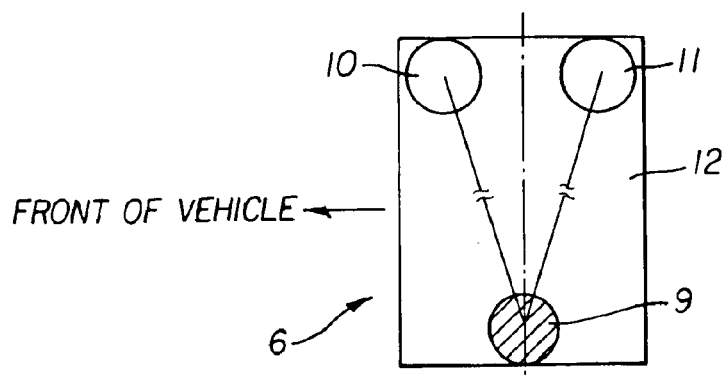
FIG. 3 is a plan view showing an inclination sensor.

As shown in FIG. 3, the inclination sensor 6 is comprised of a signal transmitting section (hereinafter referred to as "transmission sensor") 9 as an ultrasonic transmitters, and signal receiving sections 10, 11 as ultrasonic receiving sensors. The receiving sensors 10, 11 are disposed in the longitudinal direction of the vehicle with the transmission sensor 9 being interposed therebetween, and are offset to one side of the vehicle in the direction of the width at equal distances from the transmission sensor 9. The transmission sensor 9 and the receiving sensors 10, 11 are housed in a case 12, and the inclination sensor 6 is mounted on the vehicle by mounting the case 12 on the cross member 2a. An ultrasonic wave from the transmission sensor 9 is reflected on the road surface and received by the receiving sensors 10, 11, and the inclination sensor 6 detects the inclination of the vehicle according to a difference in ultrasonic wave receiving time between the receiving sensors 10, 11.

The described arrangement reduces a space required for the inclination sensor 6 in the longitudinal direction of the vehicle. Further, housing the transmitting sensor 9 and the receiving sensors 10, 11 in the case 12 reduces the size of the inclination sensor 6, and makes it easier to mount the inclination sensor 6 on the cross member 2a.

It should be noted that the transmitting sensor 9 and the receiving sensors 10, 11 may be disposed in a line in the longitudinal direction of the vehicle if there is a free space. Further, a laser sensor may be used as the inclination sensor 6, and one receiving sensor or three or more receiving sensors may be provided for one transmission sensor 9.

Signals from the transmitting sensor 9 and the receiving sensors 10, 11 are input to the ECU 7, and the ECU 7 finds the inclination of the cross member 2a (i.e. the inclination of the front part of the vehicle) with respect to the road surface according to a difference in the ultrasonic wave receiving time between the receiving sensors 10, 11.

Figure 4A:
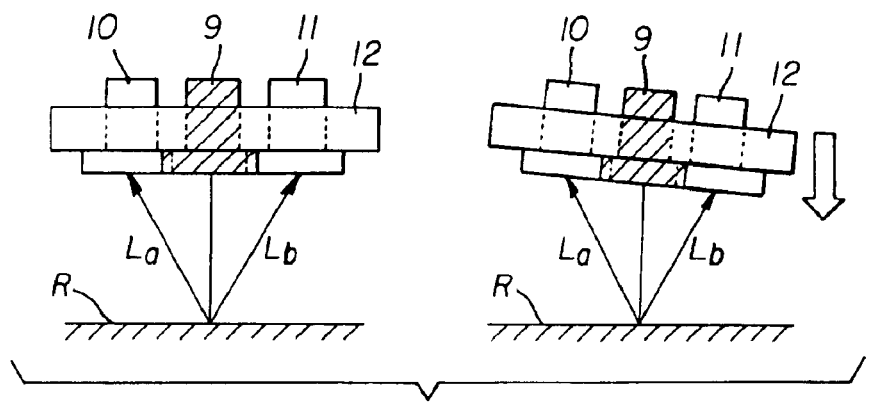
FIGS. 4A and 4B are diagrams useful in explaining the principle based on which the inclination sensor detects the inclination.
Figure 4B:
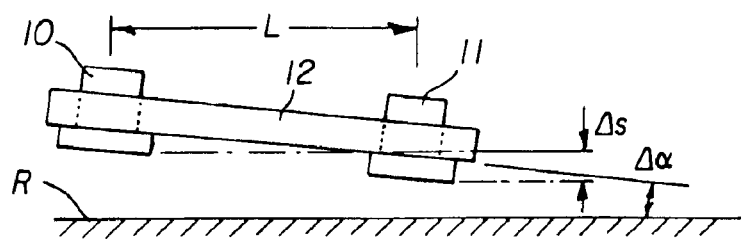

Referring to FIG. 4, a description will now be given of the principle based on which the inclination sensor 6 detects the inclination. As shown in FIG. 4A, if the front part of the vehicle is not inclined with respect to the road surface R, a route La of an ultrasonic wave transmitted from the transmitting sensor 9 to the front receiving sensor 10 and a route Lb of an ultrasonic wave transmitted from the transmitting sensor 9 to the rear receiving sensor correspond to each other, and thus, there is no difference ΔT in the receiving time between the receiving sensors 10, 11. On the other hand, if the front of the vehicle is inclined rearward with respect to the road surface R, the route La of the ultrasonic wave transmitted from the transmitting sensor 9 to the front receiving sensor 10 is longer than the route Lb of the ultrasonic wave transmitted from the transmitting sensor 9 to the rear receiving sensor 11, and thus, there is a difference ΔT in the receiving time between the receiving sensors 10, 11.

If the front part of the vehicle is inclined, there is a difference ΔS in distance from the road surface R in the direction of height between the receiving sensors 10 and 11, which are apart from each other at an interval L. The difference ΔS in the distance from the road surface depends on the difference ΔT in the receiving time, atmosphere temperature, and sonic speed. The angle of inclination Δα may be found from the difference ΔS in the distance from the road surface R and the interval L between the receiving sensors 10 and 11 in the longitudinal direction of the vehicle according to the following equation:

$$\Delta\alpha = \tan^{-1}(\Delta S/L)$$

Therefore, the ECU 7 can find the inclination of the vehicle by finding the difference ΔS in the distance from the road surface R according to the difference ΔT in the receiving time between the receiving sensors 10, 11 and calculating the angle of inclination Δα according to the above equation (1).

Figure 5:
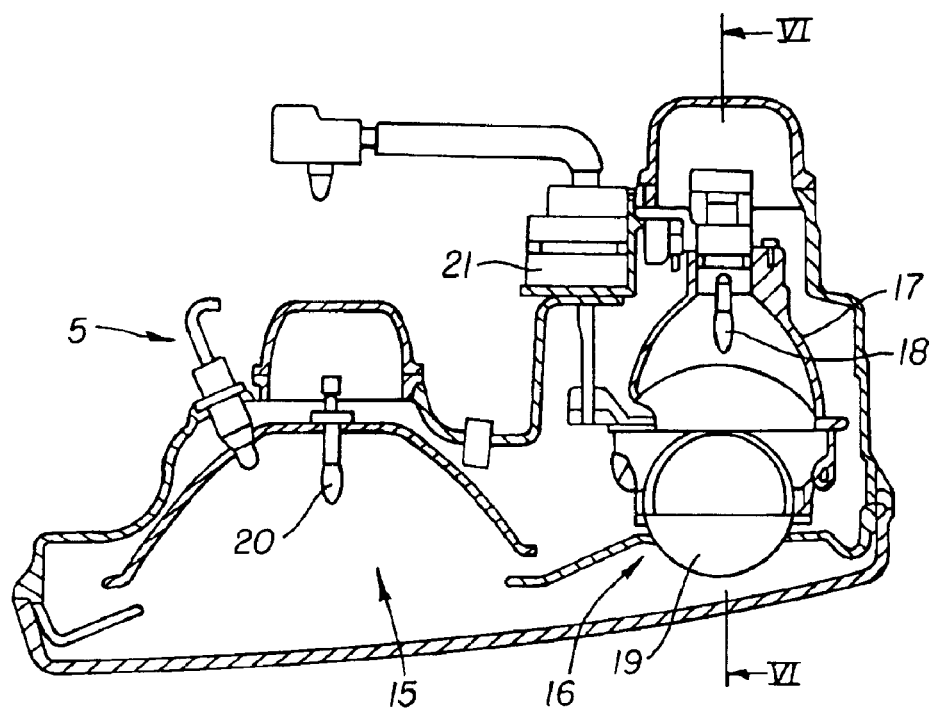
FIG. 5 is a plan view showing a head lamp provided with an optical axis adjusting device.

A description will now be given of the construction of the head lamp 5 with reference to FIGS. 5 and 6. The head lamp 5 is comprised of a Hi side lamp 15 and a Low side lamp 16. The Low side lamp 16 is a high intensity lamp, for example (e.g. discharge head lamp). The Low side lamp 16 is constructed such that a high intensity valve 18 is mounted on a reflector holder 17, and is provided with a condenser lens 19. The Hi side lamp 15 is provided with a halogen lamp 20, for example. The reflector holder 17 and the high intensity valve 18 are inclined by an actuator 21 as the optical axis adjusting device to adjust the optical axis in the vertical direction. The actuator 21 is operated in response to an instruction from the ECU 7 based on the inclination that is found by the ECU 7 according to the information supplied from the inclination sensor 6 to thereby adjust the optical axis of the high intensity valve 18.

Figure 6:
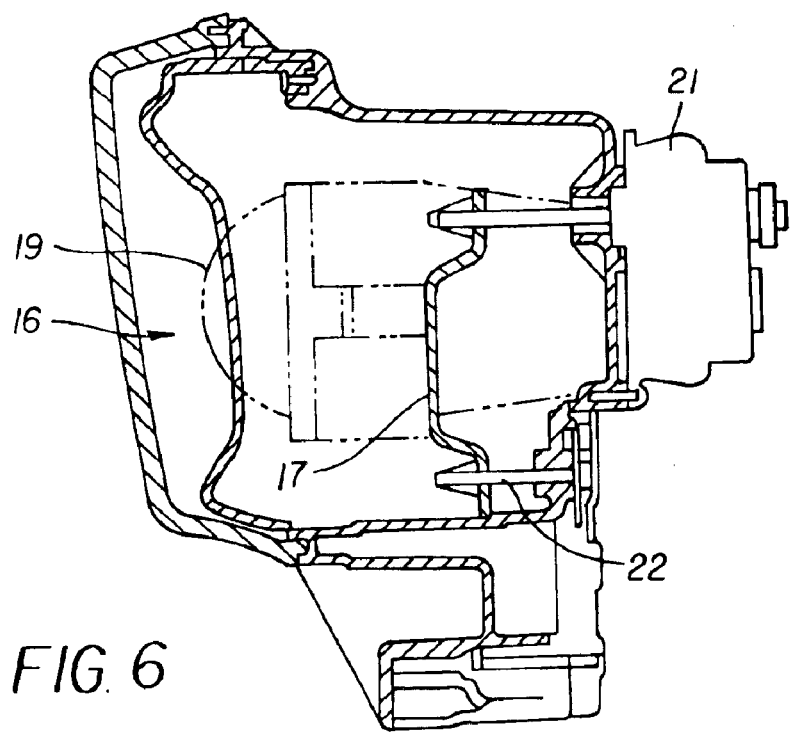
FIG. 6 is a view taken along an arrow VI—VI of FIG. 5.

As shown in FIG. 6, the Low side lamp 16 is also provided with a hand-operated screw 22 for manually controlling the reflector holder 17 to adjust the optical axis of the high intensity valve 18. The hand-operated screw 22 is used for setting the position of the optical axis of the high intensity valve 18 with respect to a position represented by the initial value of the inclination sensor 6.

It should be noted that it is possible to adjust the Hi side lamp 15 in the vertical direction by the actuator 21 as is the case with the Low side lamp 16. Further, it is possible to use a head lamp which is provided with a reflector and a valve constructed as one integral unit. If the reflector and the valve are constructed as one integral unit, the reflector is tilted by the actuator so as to adjust the optical axis of the valve.

Figure 7:
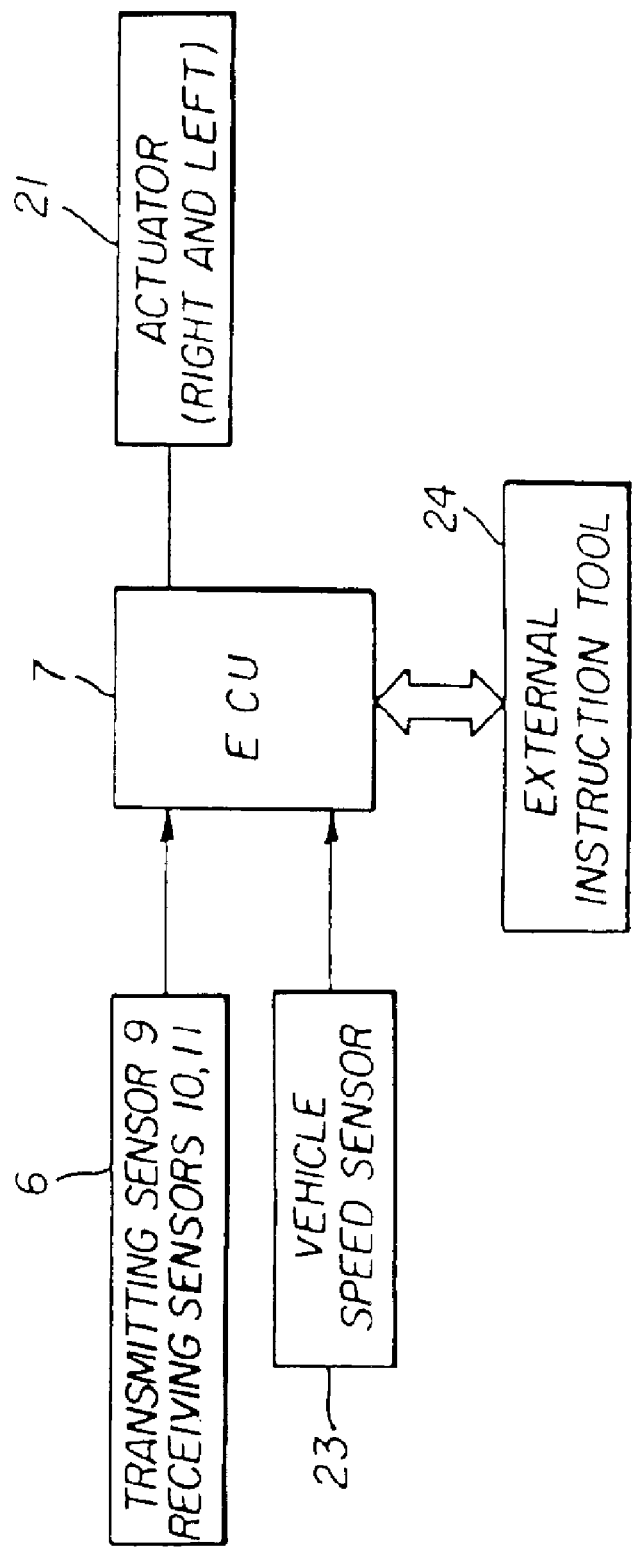
FIG. 7 is a block diagram showing the construction of the optical axis adjusting system.

Referring next to FIG. 7, a description will be given of the optical axis adjusting device for the head lamp according to the present invention. The ECU 7 receives information from a vehicle speed sensor 23 and information from the transmitting sensor 9 and the receiving sensors 10, 11 via the inclination sensor 6. According to the information supplied from the vehicle speed sensor 23, the ECU 7 determines when the vehicle stops and when the vehicle starts moving, and according to the information supplied from the transmitting sensor 9 and the receiving sensors 10 and 11, the ECU 7 calculates the above-mentioned angle of inclination Δα. The ECU 7 then outputs an instruction for driving the actuator (actuator for the right and left head lamps 5) 21 to tilt the reflector holder 17, so that the optical axis of the high intensity valve 18 is adjusted to a predetermined position according to the condition and inclination of the vehicle.

The ECU 7 also has a function of storing as an initial value of the angle of inclination Δα found in the case where there is no passenger in the vehicle and the vehicle lies on a flat road (initial value storing function). A detachable external instruction tool (e.g. failure diagnosis tool) 24 instructs the ECU 7 to store the initial value. The angle of inclination Δα found in the case where there is no passenger in the vehicle and the vehicle lies on a flat road is stored as the initial value, and in this state, the optical axis of the high intensity valve 18 is adjusted to a predetermined position by the manual-operated screw 22. On the basis of the stored initial value, the actuator 21 is driven according to the angle of inclination Δα calculated based on the information supplied from the transmitting sensor 9 and the receiving sensors 10, 11, so that the optical axis of the high intensity valve 18 is adjusted according to the inclination of the vehicle.

Therefore, even if there is a variation in the inclination detected by the inclination sensor 6, the optical axis of the high intensity valve 18 is adjusted according to the inclination that can be found with uniform accuracy. Further, since the failure diagnosis tool 24 instructs the ECU 7 to store the initial value, the initialization can easily be performed using the conventional device.

Figure 8:
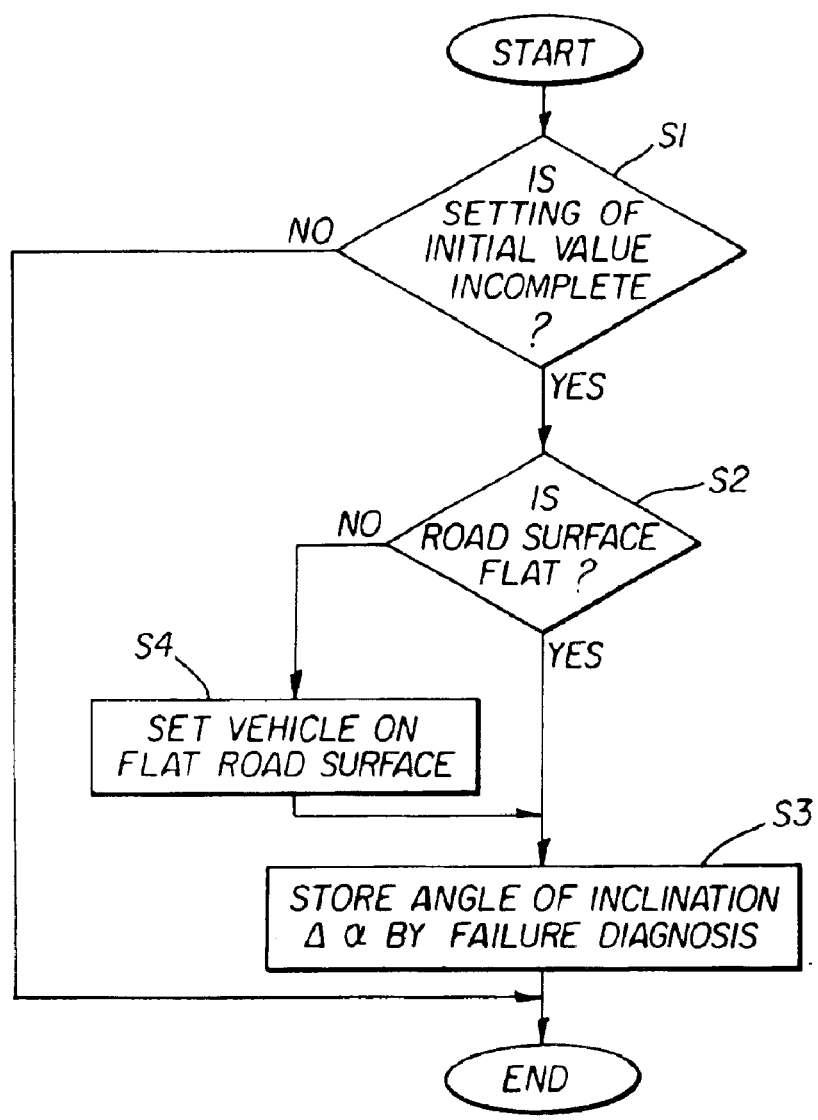
FIG. 8 is a flow chart showing the operations carried out by an ECU.
Figure 9:
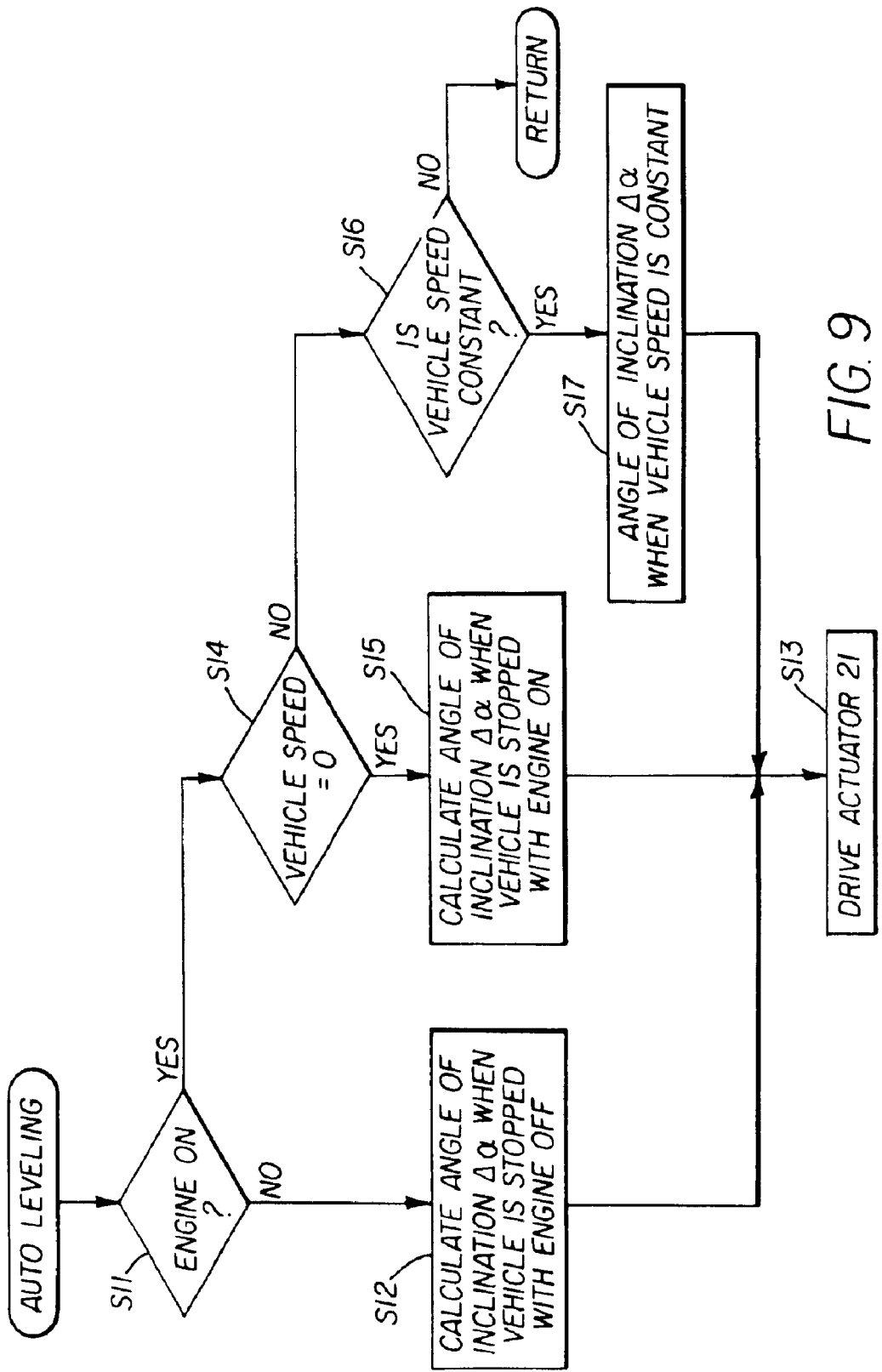
FIG. 9 is a flow chart showing the operations carried out by an ECU.

Referring to FIGS. 8 and 9, there will now be explained the operation of the above-described optical adjusting system in concrete terms with reference to FIGS. 8 and 9. First, the angle of inclination Δα calculated based on the information supplied from the transmitting sensor 9 and the receiving sensors 10, 11 is stored as the initial value by operation of the ECU 7 as shown in FIG. 8. Specifically, whether the setting of the initial value is complete or not is determined in a step S1 when the ECU 7 is calculating the angle of inclination Δα based on the information supplied from the transmitting sensor 9 and the receiving sensors 10, 11. If it is determined that the setting of the initial value is incomplete, it is then determined in a step S2 whether the road surface is flat or not. If it is determined in the step S2 that the road surface is flat, a multi-use tester (MUT)

instructs the ECU 7 to store the angle of inclination $\Delta\alpha$, detected on that occasion, as the initial value, and the ECU 7 stores the initial value according to the instruction. If it is determined in the step S2 that the road surface is not flat, the vehicle is placed on a flat road surface in a step S4 and the process then proceeds to the step S3. If it is determined in the step S1 that the setting of the initial value is complete, the process is terminated.

After the angle of inclination $\Delta\alpha$ the vehicle on the flat road surface calculated based on the information supplied from the transmitting sensor 9 and the receiving sensors 10, 11 is stored as the initial value, the reflector holder 17 and the high intensity valve 18 are tilted by the manual-operated screw 22 to adjust the optical axis of the high intensity valve 18 to an optical axis of the vehicle on the flat road surface. This starts control (auto-leveling) according to the information supplied from the transmitting sensor 9 and the receiving sensors 10, 11 based on the calculated angle of inclination $\Delta\alpha$ of the vehicle lying on the flat road surface.

As shown in FIG. 9, upon start of the auto leveling, the ECU 7 determines in a step S11 whether the engine is ON or not (with a starter being OFF). If it is determined in the step S11 that the engine is OFF (with the starter being OFF), the ECU7 calculates the angle of inclination $\Delta\alpha$ at the time when the vehicle is stopped with the engine being OFF in a step S12. Thereafter, in a step S13, the ECU 7 drives the actuator 21 according to the angle of inclination $\Delta\alpha$ based on the above initial value, so that the optical axis of the high intensity valve 18 is automatically adjusted to correct the angle of inclination of the head lamp 5 at the time when the vehicle is stopped with the engine being OFF.

If it is determined in the step S11 that the engine is ON, it is then determined in a step S14 whether the vehicle speed is zero or not. If it is determined in the step S14 that the vehicle speed is zero, the angle of inclination $\Delta\alpha$ at the time when the vehicle is stopped with the engine being ON is calculated in a step S15. Thereafter, in the step S13, the ECU 7 drives the actuator 21 according to the angle of inclination $\Delta\alpha$ based on the above initial value, so that the optical axis of the high intensity valve 18 is automatically adjusted to correct the angle of inclination of the head lamp 5 at the time when the vehicle is stopped with the engine being ON.

If it is determined in the step S14 that the vehicle speed is not zero, it is then determined in a step S16 whether the vehicle speed is constant or not.

If it is determined in the step S16 that the vehicle speed is constant (the vehicle starts moving to run in a stable condition), the angle of inclination $\Delta\alpha$ at the time when the vehicle speed is constant is calculated in a step S17. Thereafter, in the step S13, the ECU 7 drives the actuator 21 according to the angle of inclination $\Delta\alpha$ based on the above initial value, so that the optical axis of the high intensity valve 18 at the time when the vehicle starts moving is automatically adjusted to correct the angle of inclination of the head lamp 5. If it is determined in the step S16 that ten pulses have been measured as vehicle speed pulses, the process is returned to the start of the operations carried out for the running vehicle.

In the above-described embodiment, the inclination of the vehicle is determined by calculating the angle of inclination $\Delta\alpha$ at the time when the vehicle is stopped with the engine being OFF (step S12), the angle of inclination $\Delta\alpha$ at the time when the vehicle is stopped with the engine being ON (step S15), and the angle of inclination $\Delta\alpha$ at the time when the vehicle starts moving (with the vehicle speed being constant) (step S17). However, it is possible to adjust the optical axis of the high intensity valve 18 by finding the inclination at the time when the vehicle is stopped with the engine being OFF or the inclination at the time when the vehicle starts moving. Therefore, the accurate inclination of the vehicle can be found to properly adjust the optical axis.

Further, the optical axis of the high intensity valve 18 may be adjusted based on the average of the inclination at the time when the vehicle is stopped and the inclination at the time when the vehicle starts moving. For example, in the case where the vehicle is not inclined, the angle of inclination $\Delta\alpha$ different from the initial value may be acquired if a tire is run on a stone or furrow while the vehicle is stopped. In this case, by adjusting the optical axis based on the average of the inclinations, the inclination of the vehicle at the time when the vehicle starts running (with the vehicle speed being constant) (the inclination of the vehicle that is running in a stable condition in the case where an obstacle such as a stone is considered to be eliminated) is taken into consideration to find the accurate inclination.

Although in the above-described embodiment, the actuator 21 is driven according to the angle of inclination $\Delta\alpha$ that is fixed after it is corrected, the angle of inclination $\Delta\alpha$ may be corrected while the vehicle is running or may be corrected constantly. Further, although in the above-described embodiment, whether the vehicle starts running or not is determined according to whether the vehicle speed is constant or not, it may be determined according to whether a predetermined number of pulses from the vehicle speed sensor 23 has been measured at the start of the vehicle or not (for example, ten to several tens of pulses corresponding to the maximum vehicle speed in the case where the vehicle starts running). In this case, the angle of inclination $\Delta\alpha$ is calculated before the vehicle speed pulses reaches the predetermined number of pulses, and the actuator 21 is driven according to the calculated angle of inclination $\Delta\alpha$. The actuator 21 may be driven at every angle of inclination $\Delta\alpha$ calculated until the predetermined number of pulses is measured, or the actuator 21 may be driven according to the average of the calculated angles of inclination $\Delta\alpha$.

Figure 10:
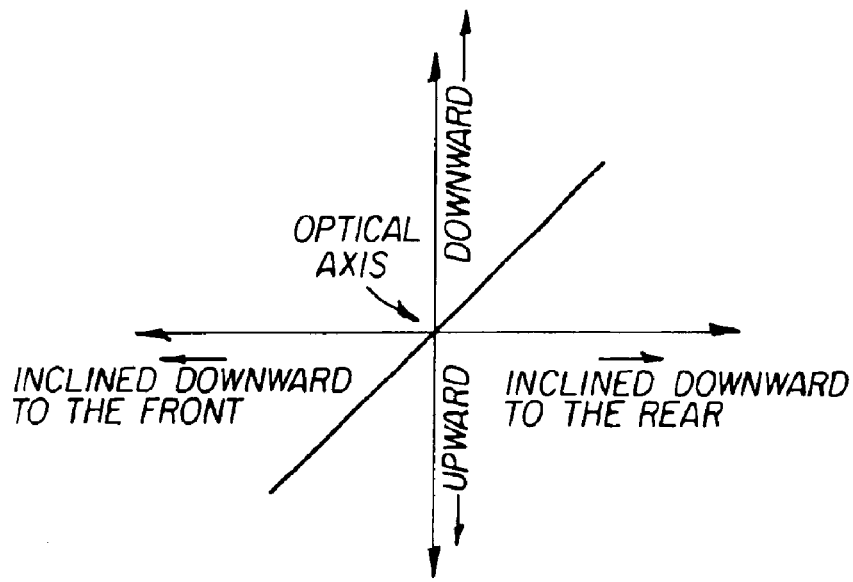
FIG. 10 is a graph showing the relationship between the angle of inclination of a vehicle with respect to an initial position and the angle of a head lamp.

FIG. 10 shows the relationship between the angle of inclination $\Delta\alpha$ and the inclination of the high intensity valve 18. As shown in FIG. 10, the optical axis of the high intensity valve 18 is adjusted to be raised at such an angle of inclination $\Delta\alpha$ that the front part of the vehicle is lower than the rear part of the vehicle, and the optical axis of the high intensity valve 18 is adjusted to be lowered at such an angle of inclination $\Delta\alpha$ that the rear of the vehicle is lower than the front of the vehicle. The relationship between the angle of inclination $\Delta\alpha$ and the inclination of the high intensity valve 18 is determined arbitrarily (represented by a straight line or curved line).

Even if the front part of the vehicle is lower than the rear part of the vehicle, the optical axis of the high intensity valve 18 may be corrected only when the vehicle is inclined at such an angle of inclination $\Delta\alpha$ that the rear part of the vehicle is lower than the front part of the vehicle insofar as the brightness is maintained to such an extent that the field of vision is not obstructed.

Figure 11:
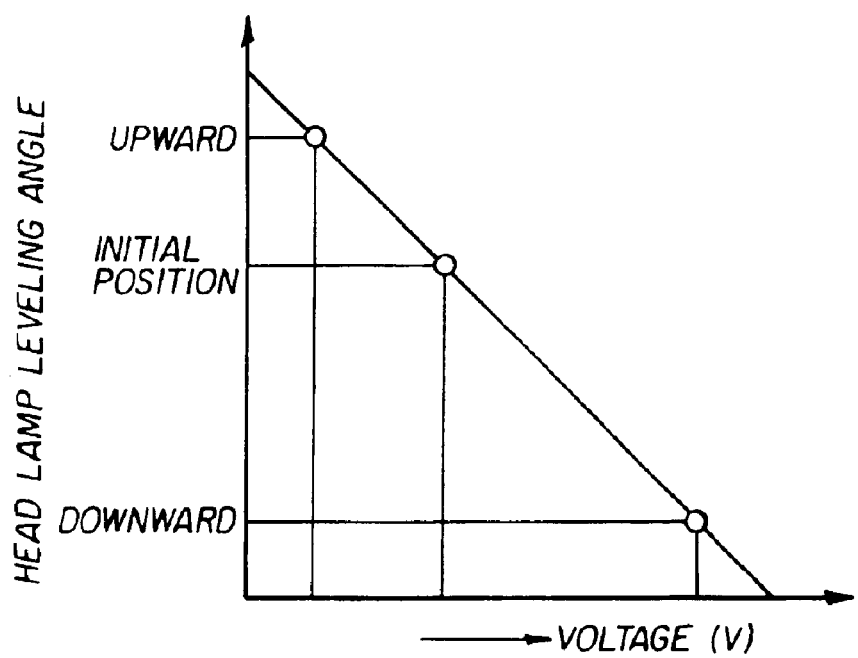
FIG. 11 is a graph showing the relationship between the voltage of an actuator and the angle of the head lamp.
Figure 12:
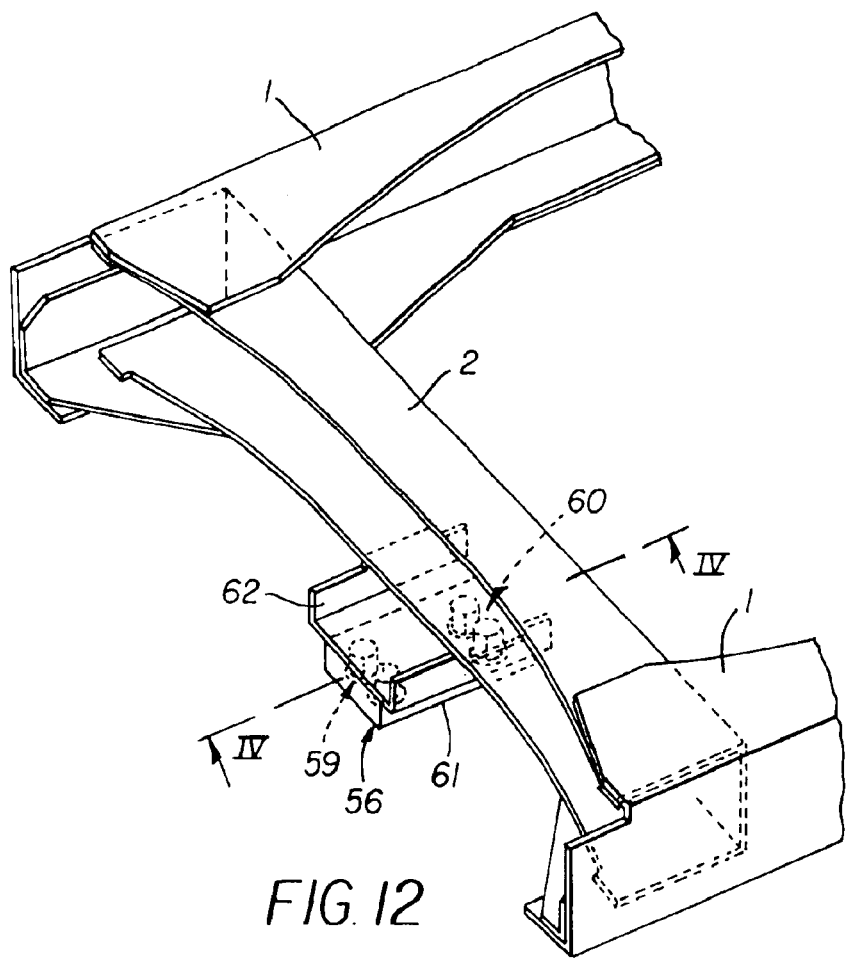
FIG. 12 is a schematic view showing the entire frame of the truck on which is mounted an ultrasonic sensor.
Figure 13:
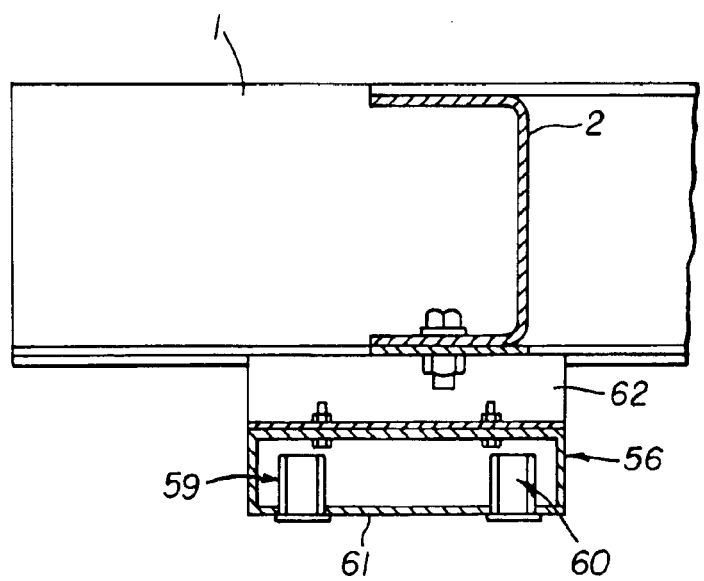
FIG. 13 is a sectional view taken along line IV—IV of FIG. 12.
Figure 14:
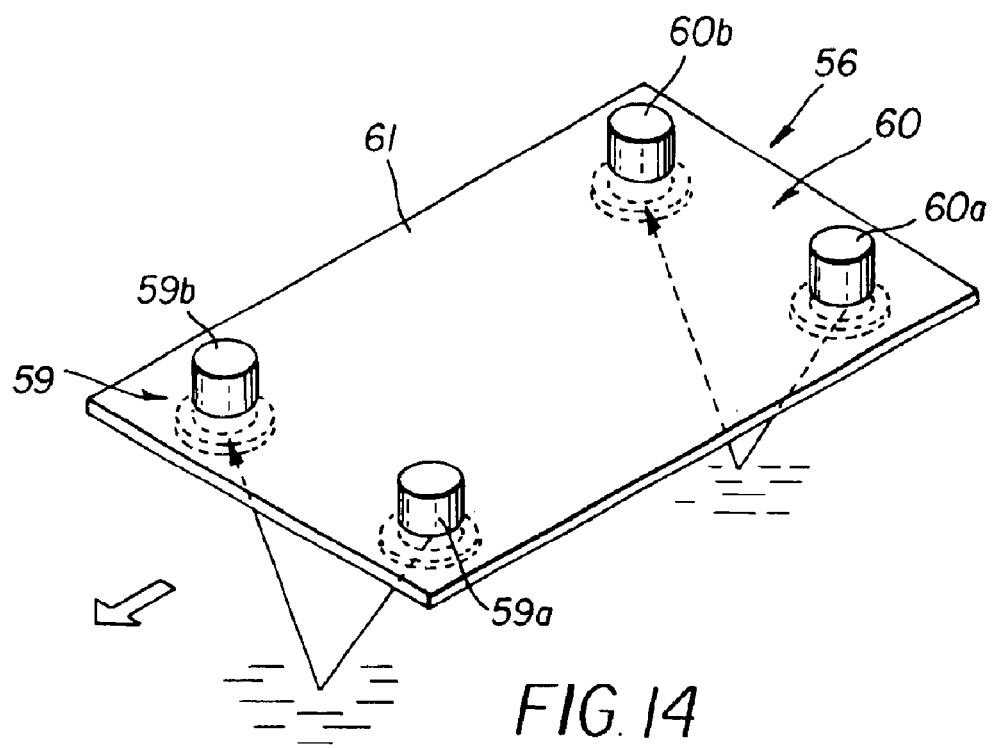
FIG. 14 is a schematic view showing the state in which the inclination sensor is mounted.

FIG. 11 shows the relationship between the command voltage applied to the actuator 21 and the optical axis of the high intensity valve 18. As shown in FIG. 11, the optical axis of the high intensity valve 18 is continuously adjusted from a downward position to an upward position across a position represented by the initial value according to the command voltage applied to the actuator 21.

In the above-described optical axis adjusting system for the head lamp, the inclination of the vehicle is found referring to the cross member 2a at the front of the vehicle, and even if the side frame 1 is deflected, the angle of inclination Δα of the vehicle can be calculated without taking the deflection into consideration. Thus, the inclination of the head lamp 5 can be automatically corrected according to the angle of inclination Δα of the vehicle. Therefore, the accurate inclination of the vehicle can be found to property adjusts the optical axis of the high intensity lamp 18, and prevents the vehicle from dazzling drivers of vehicles running on the opposite lane.

Further, in the above-described optical adjusting system, the inclination of the head lamp 5 is corrected according to the angle of inclination Δα in the normal state, i.e. at the time when the vehicle is stopped or at the time when the vehicle starts moving. Therefore, even in the case where the inclination of the optical axis is restricted, the optical axis can be easily adjusted in conformity with the restriction.

In addition, if the inclination of the optical axis of the high intensity lamp 18 in the normal state, adjusted by the above-described optical axis adjusting system, can be estimated from the vehicle speed and the condition of the load, the optical axis may be corrected according to the estimated inclination based on the state of the optical axis of the high intensity lamp 18 corrected when the vehicle speed is constant.

A description will now be given of an optical axis adjusting system for a vehicle head lamp according to another embodiment of the present invention. The construction of the optical axis adjusting system for the head lamp according to this embodiment is identical with the optical axis adjusting system according to the above-described embodiment except for an inclination sensor, and therefore, a description thereof is omitted herein.

As shown in FIGS. 12–15, the inclination sensor 56 is comprised of two ultrasonic sensors 59, 60 that transmit and receive signals in the direction of the vehicle width. The two ultrasonic sensors 59, 60 are comprised of two transmitting sensors 59*a*, 60*a* as signal transmitters and receiving sensors 59*b*, 60*b* as signal receivers. The transmitting sensors 59*a*, 60*a* are disposed at the left side of the vehicle, and the receiving sensors 59*b*, 60*b* are disposed at the right side of the vehicle. The respective ultrasonic waves transmitted and received by the ultrasonic sensors 59, 60 are substantially parallel to each other, and are substantially perpendicular to the longitudinal direction of the vehicle.

The ultrasonic sensors 59, 60 are housed in a box-shaped case 61 such that the transmitting and receiving bottom surfaces thereof are exposed. By mounting the case 61 on the intermediate section of the cross member 2 via a bracket 62 shaped like an alphabet C, the inclination sensor 60 is mounted on the front of the vehicle such that it is positioned opposite to the road surface R. This arrangement reduces a space required for mounting the inclination sensor 60 in the longitudinal direction of the vehicle, and housing the ultrasonic sensors 59, 60 in the case 61 reduces the size of the inclination sensor 60 and makes it easier to mount the inclination sensor 60 on the cross member 2.

Although the two ultrasonic sensors 59, 60 comprised of the transmitting sensors 59*a*, 60*a* and the receiving sensors 59*b*, 60*b* constructed as separate units are provided in the longitudinal direction of the vehicle, three or more ultrasonic sensors may be provided or two ultrasonic sensors each comprised of a transmitting sensor and a receiving sensor constructed as one integral unit may be provided in the longitudinal direction of the vehicle.

The inclination sensor 56 detects the inclination of the vehicle with respect to the road surface R according to a difference in ultrasonic wave receiving time between the two ultrasonic wave sensors 59, 60. The ultrasonic waves transmitted from the respective transmitting sensors 59*a*, 60*a* are reflected on the road surface R and received by the respective receiving sensors 59*b*, 60*b*, and the inclination of the vehicle with respect to the road surface R is detected according to a difference in the ultrasonic wave receiving time between the receiving sensors 59*b*, 60*b*. Namely, signals from the transmitting sensors 59*a*, 60*a* and the receiving sensors 59*b*, 60*b* are inputted to the ECU 7, and a finding section detects the inclination of the cross member 2 at the front of the vehicle (the inclination of the front part of the vehicle) with respect to the road surface according to the difference in the receiving time between the receiving sensors 59*b*, 60*b*. It should be noted that although the inclination sensor 56 detects the inclination of the vehicle with respect to the road surface R according to the difference in the receiving time, the inclination of the vehicle with respect to the road surface R may be found according to a difference in receiving phase.

Figure 15:
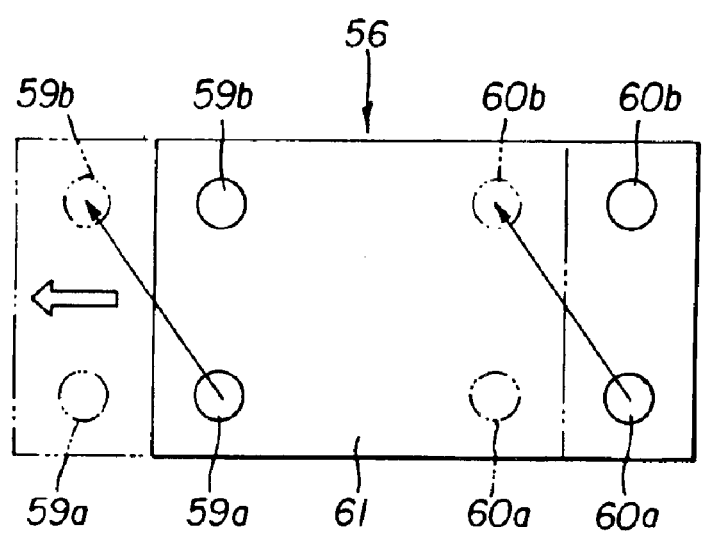
FIG. 15 is a plan view showing the state in which the inclination sensor is mounted.

Referring to FIGS. 15 and 16, a detailed description will now be given of a method for finding the inclination of the vehicle according to signals inputted from the inclination sensors 59 and 60. As shown in FIG. 15, the respective transmitting sensors 59*a*, 60*a* of the two ultrasonic sensors 59, 60 transmit the ultrasonic waves toward the road surface R such that they are reflected on the receiving sensors 59*b*, 60*b*. When the vehicle is running, however, the positions of the receiving sensors 59*b*, 60*b* are different at the time when the transmitting sensors 59*a*, 60*a* transmit the ultrasonic waves and at the time when receiving sensors 59*b*, 60*b* receive the ultrasonic waves. Therefore, the respective transmitting sensors 59*a*, 60*a* may predict the positions of the receiving sensors 59*b*, 60*b* relative to the transmitting sensors 59*a*, 60*a* according to the vehicle speed and the ultrasonic wave speed, and transmit ultrasonic wave signals to the predicted positions of the receiving sensors 59*b*, 60*b*.

Figure 16A:
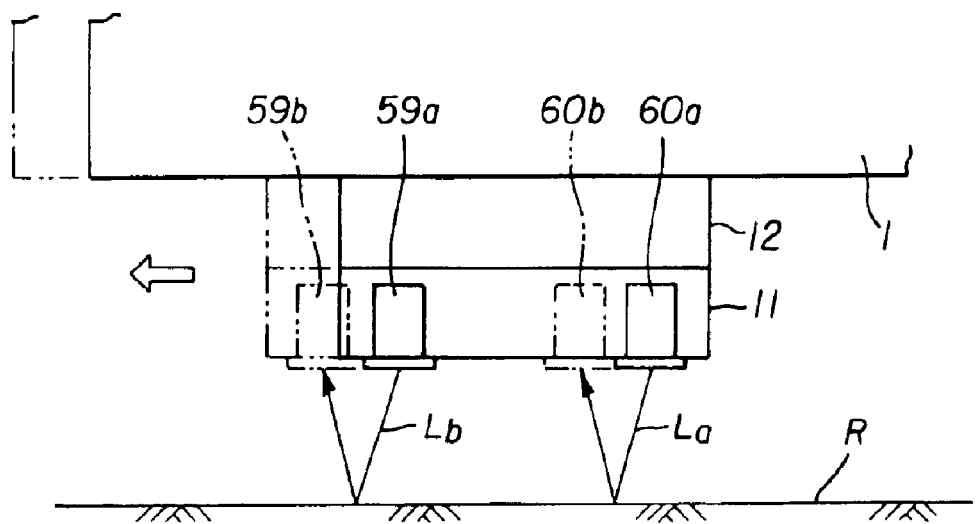
FIGS. 16A and 16B are views useful in explaining a method of finding the inclination.

If the front part of the vehicle (the front cross member 2) is not inclined with respect to the road surface R as shown in FIG. 16A, the route La of the ultrasonic wave transmitted from the front transmitting sensor 59*a* to the receiving sensor 59*b* and the route Lb of the ultrasonic wave transmitted from the rear transmitting sensor 60*a* to the receiving sensor 60*b* correspond to each other, and thus, there is no difference ΔT in the receiving time of the ultrasonic waves received by the receiving sensors 59*b*, 60*b*. On the other hand, if the rear part of the vehicle is lowered due to load on the deck 4 and the front part of the vehicle is inclined rearward (upward) with respect to the road surface R, the route La of the ultrasonic wave transmitted from the front transmitting sensor 59*a* to the receiving sensor 59*b* is longer than the route Lb of the ultrasonic wave transmitted from the rear transmitting sensor 60*a* to the receiving sensor 60*b*, and thus, there is a difference ΔT in the ultrasonic wave receiving time between the receiving sensors 59*b*, 60*b*.

If the front part of the vehicle is inclined rearward as mentioned above, there is a difference ΔS in distance from the road surface R between the transmitting sensors 59*a*, 60*a* which are apart from each other at an interval L. This difference ΔS in height from the road surface R depends on the difference ΔT in the receiving time, atmosphere temperature, and sonic velocity. The angle of inclination Δα can be found according to the following equation based on the difference Δα in the distance from the road surface R and the interval L between the receiving sensors 59*b*, 60*b* in the longitudinal direction:

$$\Delta\alpha = \tan^{-1}(\Delta S/L)$$

Therefore, the ECU7 finds the inclination of the vehicle by finding the difference ΔT in the ultrasonic wave receiving time between the receiving sensors 59b, 60b and calculating the angle of inclination Δα according to the above equation.

Figure 16B:
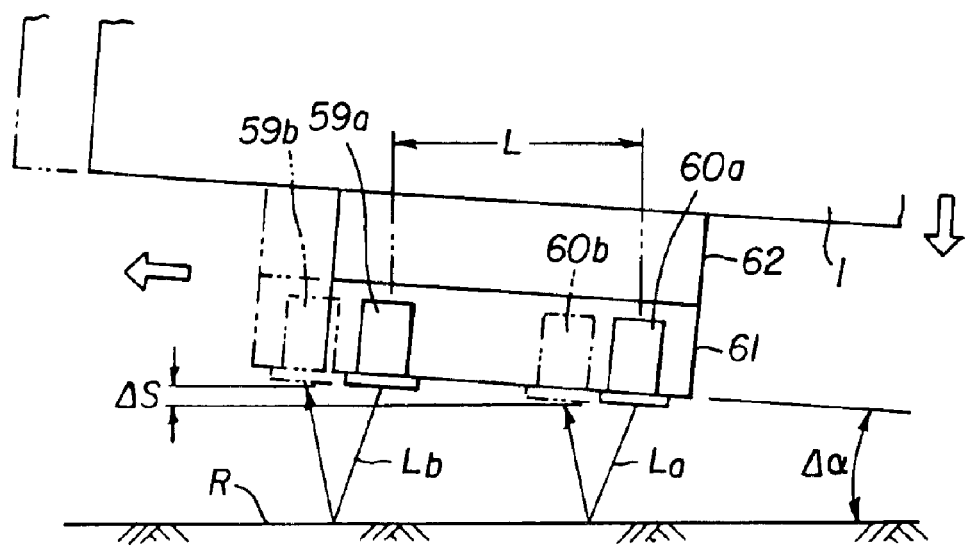

Contrary to FIG. 16B, if the front part of the vehicle is inclined to the front (downward) with respect to the road surface R due to load on the deck 4, there is a difference ΔT in ultrasonic wave receiving time between the receiving sensors 59b, 60b, and the inclination of the vehicle can be found by calculating the angle of inclination Δα according to the above equation.

What is claimed is:

1. An optical axis adjusting system for a bead lamp disposed on a cross member disposed at a front end of a vehicle, comprising:
   an optical axis adjusting device that adjusts an optical axis of the head lamp;
   an inclination detecting device disposed on the cross member for detecting an inclination of the front part of the vehicle with respect to a road surface; and
   a control device tat controls said optical axis adjusting device according to the inclination detected by said inclination detecting device.

2. An optical axis adjusting system for a vehicle bead lamp, comprising:
   an optical axis adjusting device that adjusts an optical axis of the head lamp;
   an inclination detecting device disposed in a front part of a vehicle to detect an inclination of the front part of the vehicle with respect to a road surface; and
   a control device that controls said optical axis adjusting device according to the inclination detected by said inclination detecting device,
   wherein said inclination detecting device comprises an inclination sensor comprised of at least one signal transmitting section and a plurality of receiving sections for receiving respective ones of signals transmitted from said signal transmitting section, and a finding section that finds an inclination of the vehicle with respect to the road surface according to a difference in signal receiving time between said signal receiving sections.

3. An optical axis adjusting system for a vehicle head lamp according to claim 2, wherein said signal transmitting section and said signal receiving sections are disposed in parallel in a direction of vehicle width and said signal receiving sections receive signals transmitted from said signal transmitting section via the road surface.

4. An optical axis adjusting system for a vehicle head lamp according to claim 3, wherein positions of said signal receiving sections are predicted according to a vehicle speed and said signal transmitting section transmits signals to the predicted positions of said signal receiving sections.

5. An optical axis adjusting system for a vehicle head lamp according to claim 2, wherein transmission waves are transmitted substantially in parallel from said signal transmitting section.

6. An optical axis adjusting system for a vehicle head lamp according to claim 2, wherein two of said signal receiving sections are disposed with said signal transmitting section positioned therebetween in a longitudinal direction of the vehicle.

7. An optical axis adjusting system for a vehicle head lamp according to claim 2, wherein said control device comprises a vehicle stop determining function of determining whether the vehicle is stopped, and finds the inclination of the vehicle when the vehicle is stopped and the inclination of the vehicle when to vehicle starts moving by the stop determining function, and controls said optical axis adjusting device according to at least one of the inclination when the vehicle is stopped and the inclination when the vehicle starts moving.

8. An optical axis adjusting system for a vehicle head lamp according to claim 2, wherein said control device controls said optical axis adjusting device according to an average of the inclination when the vehicle is stopped and the inclination when the vehicle starts moving.

9. An optical axis adjusting system for a vehicle head lamp according to claim 2, wherein said inclination detecting device is mounted in front of a front axle of the vehicle.

10. An optical axis adjusting system for a vehicle head lamp according to claim 2, wherein the vehicle has a pair of side fumes extending in a longitudinal direction of the vehicle, and a cross member is connected to front ends of said side frames, and said inclination detecting device is disposed in a substantially central section of said cross member.

11. An optical axis adjusting system for a vehicle head lamp according to claim 2, wherein said control device has an initial value storing function of storing as an initial value the inclination detected by said inclination detecting device when the vehicle with no load lies on a flat road, and controls said optical axis adjusting device according to the inclination detected by said inclination detecting device based on the initial value stored by the initial value storing function.

12. An optical axis adjusting system for a vehicle head lamp according to claim 11 wherein said control device instructs an external instructing device detachable from a vehicle body to store the initial value by the initial value storing function.

13. An optical axis adjusting system for a head lamp according to claim 1, wherein the inclination detecting device is positioned in front of a front axle of the vehicle.

14. An optical axis adjusting system for a head lamp according to claim 1, wherein said inclination detecting device is comprised of ultrasonic transmitters and ultrasonic receiving sensors.

15. An optical axis adjusting system for a vehicle head lamp according to claim 2, wherein said inclination detecting device is comprised of ultrasonic transmitters and ultrasonic receiving sensors.

16. An optical axis adjusting system for a head lamp according to claim 13, wherein said inclination detecting device is comprised of ultrasonic transmitters and ultrasonic receiving sensors.

17. An optical axis adjusting system for a vehicle head lamp, comprising:
   an optical axis adjusting device that adjusts an optical axis of the head lamp;
   an inclination detecting device disposed in a front part of a vehicle for detecting an inclination of the front part of the vehicle with respect to a road surface; and
   a control device that controls said optical axis adjusting device according to the inclination detected by said inclination detecting device,
   wherein the vehicle is a truck, and said inclination detecting device is disposed at the cab of said truck.

18. An optical axis adjusting system for a vehicle head lamp according to claim 2, wherein the vehicle is a truck, and said inclination detecting device is disposed at the cab of said truck.

19. An optical axis adjusting system for a vehicle head lamp according to claim 17, wherein said inclination detecting device is disposed in front of a front axle of said truck.

20. An optical axis adjusting system for a head lamp according to claim 1, wherein the inclination detecting device is disposed substantially at the center of the cross member.

21. An optical axis adjusting system for a head lamp according to claim 1, wherein the vehicle is a truck.

* * * * *